H. WALTHER.

PULLING-OVER MACHINE.

APPLICATION FILED SEPT. 1, 1920.

Reissued Mar. 14, 1922.

15,309.

3 SHEETS—SHEET 1.

INVENTOR.
Heinrich Walther
By his Attorney
Nelson W. Howard

H. WALTHER.

PULLING-OVER MACHINE.

APPLICATION FILED SEPT. 1, 1920.

Reissued Mar. 14, 1922.

15,309.

3 SHEETS—SHEET 2.

INVENTOR.
Heinrich Walther
By his Attorney
Nelson W. Harrard

H. WALTHER.
PULLING-OVER MACHINE.
APPLICATION FILED SEPT. 1, 1920.
Reissued Mar. 14, 1922.
15,309.
3 SHEETS—SHEET 3.
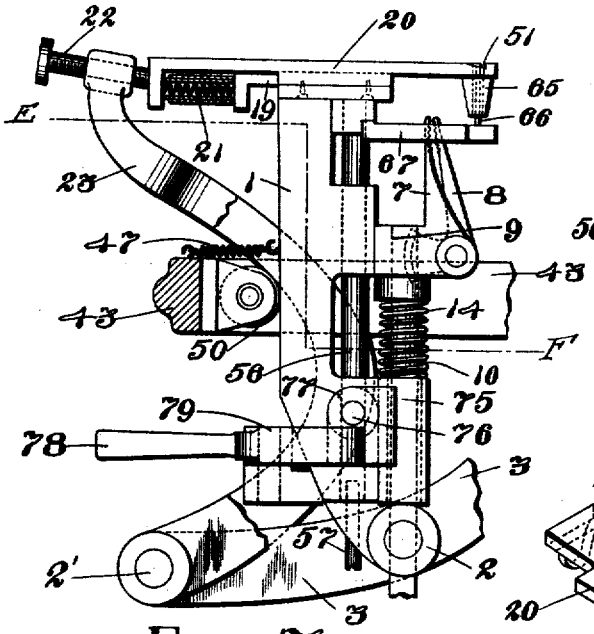
Fig: 7.
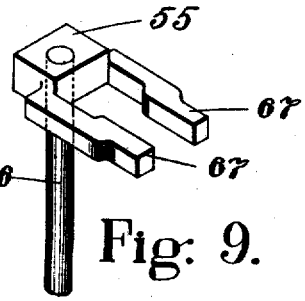
Fig: 9.
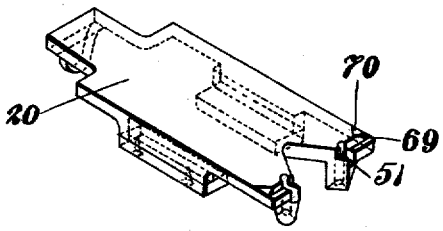
Fig: 10.
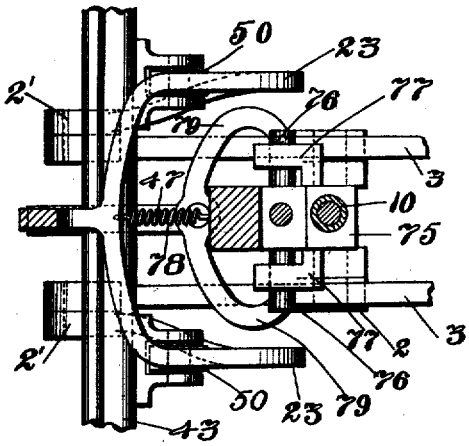
Fig. 8.
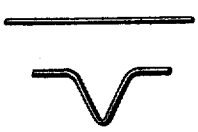
Fig: 11.
Fig: 12.
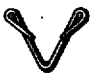
Fig: 13.
INVENTOR.
Heinrich Walther
By his Attorney,
Nelson W. Howard

UNITED STATES PATENT OFFICE.

HEINRICH WALTHER, OF FRANKFORT-ON-THE-MAIN, GERMANY, ASSIGNOR, BY MESNE ASSIGNMENTS, TO UNITED SHOE MACHINERY COMPANY, OF PATERSON, NEW JERSEY, A CORPORATION OF NEW JERSEY.

PULLING-OVER MACHINE.

15,309. Specification of Reissued Letters Patent. Reissued Mar. 14, 1922.

Original No. 1,110,170, dated September 8, 1914, Serial No. 369,326, filed April 20, 1907. Application for reissue filed September 1, 1920. Serial No. 407,562.

*To all whom it may concern:*

Be it known that I, HEINRICH WALTHER, a subject of the German Emperor, residing at Frankfort-on-the-Main, Germany, have invented certain Improvements in Pulling-Over Machines, of which the following description, in connection with the accompanying drawings, is a specification, like reference characters on the drawings indicating like parts in the several figures.

This invention relates to machines for use in the manufacture of boots and shoes for the purpose of shaping the shoe upper to the last; and an important feature of the invention consists in a novel organization of pulling-over and lasting mechanism comprising toe and side pincers for gripping and pulling the upper, together with an end embracing wiper associated with the toe pincers for lasting the toe end of the upper and tacking devices associated with the side pincers and the wiper.

A further feature of the invention consists in a novel control for upper fastening means, comprising in the illustrative embodiment of the invention means whereby the operator is enabled to render the upper fastening means of a pulling-over machine ineffective to fasten the upper in case the upper is not satisfactorily positioned with reference to the last, thus permitting the machine to complete its cycle of operations and release the upper without fastening it in a false position. The illustrative construction provides means manually movable at the will of the operator while the upper is under tension into position to suppress the operation of the fastener driving means.

Further features of the invention reside in novel means for adjusting the toe pincers transversely of the last and in various details of construction and combinations of parts, all of which will now be described with reference to the accompanying drawings and pointed out in the claims.

In the drawings:

Fig. 7 is a side elevation of the toe pincer carrier;

Fig. 8 is a horizontal section on the line E—F of Fig. 7;

Fig. 9 shows a hammer associated with the toe pincers;

Fig. 10 shows the binding-in wiper; and

Figs. 11, 12 and 13 show the binding-in wire in three working stages of the machine.

Figure 5:
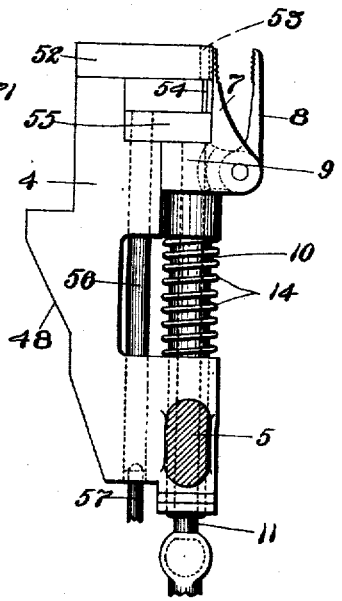
Fig. 5 shows a side pincer carrier with the pivot 5 broken away.
Figure 3:
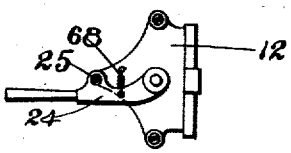
Fig. 3 shows a hand lever 24 for releasing the toe pincers.

The carrier 1 of the toe pincers is pivotally attached at 2 to brackets 3 of the machine frame. The carriers 4 of the side pincers are supported by pivots 5 in sockets 6 of the machine. The carriers 4 may therefore be rocked inward and moved lengthwise of the shoe. The pincers consist of a stationary jaw 7 and a movable jaw 8 (see Figs. 5 and 7). The stationary jaws are of one piece with guiding blocks 9 having sleeves 10 containing sliding bars 11. These bars are connected on one side by a rack or an equivalent means with the movable jaws, and at their lower ends by links and rods 27 with a frame 12, springs 13 being interposed between the frame and nuts on the ends of the rods. The pincers are supported by means of springs 14 interposed between the blocks 9 and the carriers. The frame 12 is operated by a roller 15 in a groove 16 of a disk 17 mounted on the driving shaft 18 (see Figs. 1 and 6). In moving down, the frame 12 first closes the side pincers which are normally open and pulls them thereupon downward. The pincer carrier 1 is provided with a guide plate 19 for a binding-in wiper 20 (Fig. 7). A spring 21 pushes the wiper 20 outward against a set screw 22 of a forked lever 23 pivoted at 2′ in the brackets 3.

Figure 1:
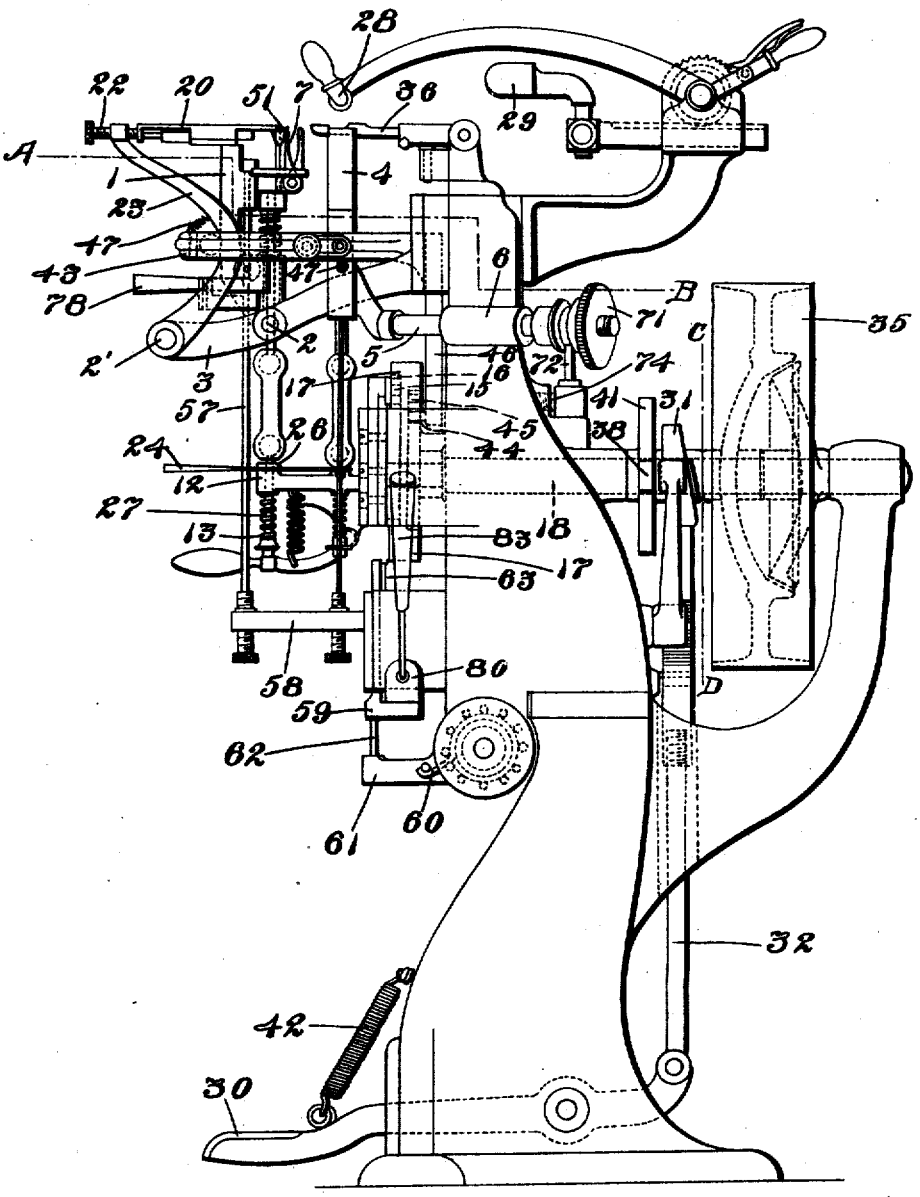
Figure 1 is a side elevation of a machine in which the invention is embodied.

Before the machine is started the toe part of the upper is introduced into the open toe-pincers. Upon the swinging aside of a lever 24 having fingers 25 projecting under a collar 26 of one of the rods 27, the corresponding spring 13 comes into action to close the toe pincers and cause them to grasp the toe part of the upper, (Figs. 1 and 7).

The shoe is then pressed down by hand on the last rest 36 and held in position by ball and heel loops 28 and 29 respectively.

Figure 4:
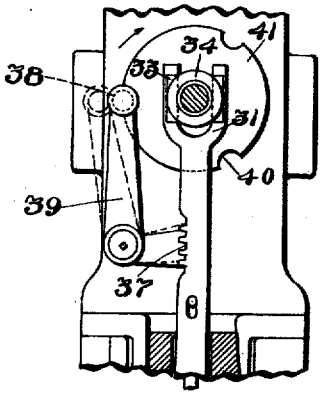
Fig. 4 is a vertical section on the line C—D of Fig. 1 and shows the clutch for operating the machine.

By depressing the treadle 30 wedges 31 on a bar 32 working against abutments 33 of a box 34 are actuated and operate to connect a belt pulley 35 with a clutch member fast on the driving shaft 18 and simultaneously disengage by means of a rack 37 a roller 38 mounted on a lever 39 from one of three recesses 40 of a disk 41 (Fig. 4). When the treadle 30 is released the roller 38 engages the cylindrical surface of the disk 41 until, through the action of a treadle spring 42, it automatically engages with the next of the notches 40, thereby permitting the clutch to be released and stopping the machine at every third of a revolution.

In the first third of the revolution the frame 12 is moved down by the cam-groove 16 to close the side pincers and cause them to grasp the side margin of the upper, whereupon the side pincers together with the front pincers are simultaneously pulled down.

The second working stage begins with the second depression of the treadle. The pincers having grasped and drawn the upper downward, the pincer carriers and the binding-in wiper are moved underneath the innersole. To do this a pulling-over frame 43 is brought into operation. This frame is moved by a groove 44 of the disk 17 through the provision of a roller 45 on a plate 46 sliding in a vertical guide of the machine. The pincer carriers are drawn by springs 47 against the frame 43, so that the side carriers bear with their inclined shoulders 48 against the rollers 49 of the frame, (Fig. 2), while the tension of the front spring 47 causes, through the medium of the spring 21, the forked lever 23 to bear against rollers 50, (Figs. 7 and 8). The pulling-over frame in rising presses the side pincer carriers and the binding-in wiper 20 underneath the sole, the wiper being operated by the lever 23 and moving from the position shown in Fig. 1 into the position shown in Fig. 7.

The binding-in wiper has on either side of its central recess, which is shaped to approximate the contour of the toe part of the last, a groove 51 to receive a binding-in wire, shaped as shown in Fig. 11. During the inward movement of the wiper the wire assumes the form shown in Fig. 12. The bent wire part embraces the toe part of the upper adjacent to the innersole rib, while the straight wire parts remain in the grooves 51 which may be dovetailed or otherwise shaped for better guiding of the wire.

At the end of the second working stage the stretched and pulled over upper is fastened by tacks on both sides to the innersole, and simultaneously therewith two tacks are driven at the toe part into the innersole around which the binding-in wire is to be bent as hereinafter described.

Figure 6:
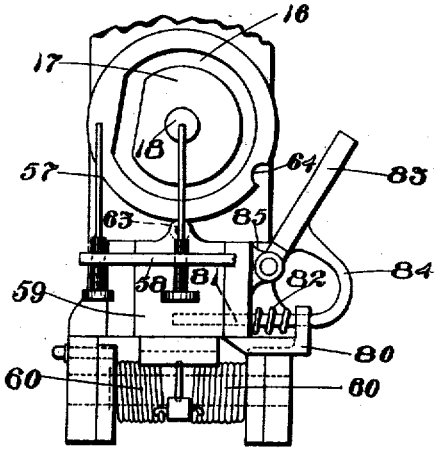
Fig. 6 illustrates the device for suppressing the tacking operation.

In the upper plates 52 of the side pincer carriers 4 (Fig. 5) are arranged tack receiving holes 53 into which the tacks are suitably fed, and there are fitted in these holes drivers 54 fixed on blocks 55. The latter are guided by rods 56 in the carriers and are connected by bars 57 with a tack driving frame 58, which has a plate 59 sliding in guides in the machine frame (Fig. 6). Beneath the frame 58 springs 60 are arranged to act upon an arm 61 which presses by means of a link 62 against the lower part of the plate 59 of the frame 58, the frame having a roll 63 bearing on the periphery of the cam 17. The roll 63 entering a recess 64 of the cam permits the drivers 54 to move upwardly for effecting the tacking. The tacking mechanism of the front pincers differs from those of the side pincers in that the tacks are fed into special nozzles 65 of the wiper 20 in which nozzles drivers 66 are positioned (Fig. 7). The block 55 has two arms 67 upon which the drivers 66 slides as the wiper moves in (Fig. 9). The openings of the nozzles and the wire receiving grooves are so related to each other that the tacks are driven just between the wire part bent to a loop and the straight parts lying in the grooves 51. The tacks having been driven, the second working stage is finished.

At the third depression of the treadle the third working stage commences. The stretching frame 12 moves upward and the pulling-over frame 43 moves downward, whereby all parts of the machine return to their initial positions. The pincers open and together with the binding-in wiper move outward. By the action of a spring 68 the lever 24 was returned with its fingers 25 under the collar 26 of the front rod 27 in the first working stage as the frame 12 began to compress the spring 13. During the outward movement of the wiper the binding-in wire is automatically fastened on the toe tacks not entirely driven in and projecting with their heads from the innersole. The edges 69 (Fig. 10) of the grooves 51 force the wire under the heads of the tacks and bend it around the tacks. The edges 70 of the groove are beveled to permit the wire to be bent only by the opposite edges 69 in the direction of the formed wire loop. (See Figs. 12 and 13, illustrating these steps.)

Figure 2:
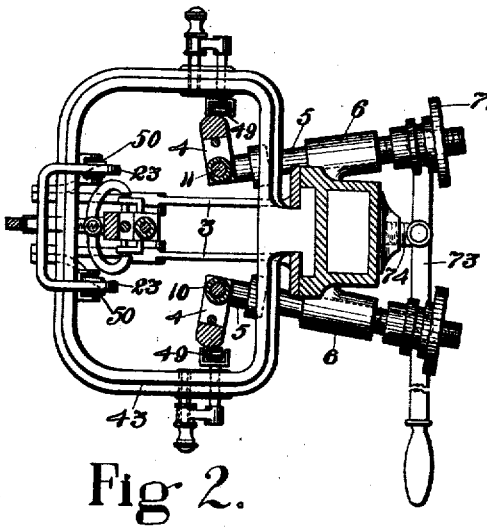
Fig. 2 is a horizontal section on the line A—B of Fig. 1, the lower parts of the machine not being shown.

To adapt the machine for the manufacture of shoes of different sizes the side pincer carriers are slidingly journaled at an inclination to the vertical median plane of the machine (Fig. 2). The pivots 5 of the pincer carriers 4 are provided with set nuts 71 held in place by bolts 72 projecting into grooves of the nuts. By operating the nuts the side pincers may be longitudinally adjusted with relation to the toe-pincers. The bolts 72 are preferably fastened to a lever 73 by the operation of which the side pincers may be temporarily adjusted with relation to each other, and a buffer arrangement comprising a spring plunger 74 bearing upon the flat face of a projection on the lever adjacent to its pivotal axis causes the return of the said pincers into their normal position. By this means the toe seam may be adjusted in case is assumes a wrong position on the last when all the pincers have stretched the leather. It is easily seen that by the adjustment of the side pincers only the toe seam and not the middle line or the back of the upper can be influenced as the pull effected by this adjustment does not tend to draw the upper transversely of the last. In order to enable the operator to adjust the upper transversely in case of need, the toe pincers are made according to the present invention adjustable in a direction transversely of the machine.

The part 75 (Figs. 7 and 8) of the toe pincer carrier holding the guiding sleeve 10 is made separate from the carrier-body and is slidingly hung on bolts 76 of the carrier by means of the side plates 77. A forked lever 78 pivoted on the carrier bears with its arms 79 on the side plates 77 and may be operated to move the part 75 with the toe pincers to either side thus displacing at will the upper to the right or to the left. If the lever 78 be operated before the machine is started and after the toe pincers only have grasped the upper, it will serve to displace the upper as a whole on the last, while when operated after all the pincers have taken hold of the upper only the position of the toe portion of the upper may be thus affected. By the action of the spring 13 the toe pincers are returned to their normal position as soon as they are released in the third working stage.

While the adjustable arrangement of the pincers makes it possible to put the upper on the last in the proper position, yet it is sometimes advisable to avoid tacking the upper to the innersole and to run the machine to the end of the revolution and then to begin again the pulling-over operation on the same shoe. This necessity is experienced, for instance, when the margin of the upper slips from one pair of pincers, or when the lining or the counter does not lie smoothly or becomes damaged, which is often noticed in the last moment just before the tacking, when the stretch of the upper is most intense. In such or like cases hitherto the tacking could not be avoided, as all parts of the machine are driven in sequence and after the pulling-over operation the tacking takes place. The driven tacks had to be pulled out, the shoe parts again assembled and the pulling-over operation repeated. Further, in the machines hitherto known the tacks were often driven too far from the margin of the upper and the upper damaged so that it could not be used.

To overcome these difficulties, according to the illustrated embodiment of the present invention a device is provided by means of which the tacking may be suppressed even in the last moment before it is ordinarily effected. For this purpose a wedge 80 (Fig. 6) may be introduced at any time between the lower part of the plate 59 of the frame 58 and the opposite wall of the machine frame against which the plate 59 lies when the frame 58, owing to the action of the springs 60, is positioned with its roll 63 in the recess 64 on the periphery of the cam 17. The wedge 80 has a guiding bolt 81 sliding in a hole of the machine frame and is held in position on one side by a spring 82 and on the other side by the bent arm 84 of a hand lever 83. By depressing this lever the wedge 80 is forced inward and prevents the tacking frame 58 from moving upward and pushing up the drivers. When released the lever 83 bears with a stop 85 against the machine wall.

It will of course be understood that the invention in its broader aspects is not limited to the specific embodiment thereof described and shown in this specification, but that the invention may be embodied in many different mechanical forms and that its several features are each capable of advantageous use independently of other features.

What I claim is:

1. In a pulling-over machine, a wiper provided with tack receiving holes, pincers journaled beneath the wiper, and means for moving the pincers obliquely with respect to the wiper.

2. In a machine of the class described, tacking mechanism including tack drivers, a wedge movable into position to prevent actuation of the drivers, and a spring acting to normally hold the wedge out of such position.

3. In a machine of the class described, tacking mechanism including tack drivers, a wedge movable into position to prevent actuation of the drivers, a hand lever for moving the wedge, and a spring acting to normally hold the wedge out of such position.

4. In a pulling-over machine, a plurality of pincers for gripping and stretching the upper, means for adjusting the pincers longitudinally of the last, a plurality of tack drivers, means for suppressing the operation of the tack drivers while the upper is under tension, to avoid fastening the latter in false position, and a handle for actuating the means for suppressing the operation of the tack drivers.

5. In a device of the class described, the combination with side pincers, of means for forcibly adjusting the side pincers longitudinally of the last, toe pincers, a toe wiper extending on either side of the toe pincers, tacking means associated with the side pincers, and a plurality of tacking drivers associated with the toe wiper and toe pincers.

6. In a device of the class described, the combination with side pincers, of toe pincers, a handle for forcibly adjusting the toe pincers along the toe of the last, and means for automatically returning the toe pincers to their original position.

7. In a pulling-over machine, the combination with pincers for gripping and stretching an upper, of a plurality of tack drivers, means for suppressing the operation of the tack drivers to avoid fastening the upper in a false position, and means operative manually while the upper is under tension for rendering said suppressing means effective to prevent the driving of tacks.

8. In a pulling-over machine, the combination with pincers for gripping an upper, of means for operating said pincers to cause them to stretch the upper and to come to rest while holding the upper tension, a plurality of tack drivers operative upon a subsequent starting of the machine, means movable into position to suppress the operation of the tack drivers, and means operative manually while the upper is under tension for rendering said suppressing means effective to prevent the driving of tacks while the machine completes its cycle of operations.

9. In a pulling-over machine, the combination with means for pulling an upper over a last at the toe end and at opposite sides of the forepart at one operation, and means for subsequently driving at one operation a plurality of tacks to fasten the upper at the toe and at the sides of the forepart, of mechanism movable into or out of position to prevent the tacking at a plurality of points in the upper fastening portion of the cycle of the machine.

10. In a pulling-over machine, the combination with pincers for gripping and stretching an upper, of means for driving fasteners to retain the upper in position, and means manually operative while the upper is under tension and prior to the driving of fasteners for rendering said fastener driving means ineffective to fasten the upper during the completion of the cycle of operations of the machine.

11. In a machine of the class described, the combination with means for working an upper over a last, and power means automatically operative subsequently in the cycle of the machine to drive a plurality of fasteners in position to fasten the upper at the opposite sides of the last, of a controlling device movable into or out of position to prevent the driving of fasteners in the upper fastening portion of the cycle of the machine.

12. In a machine of the class described, the combination with upper pulling means automatically operative to pull an upper over a last and to come to a stop with the upper held under tension, and means operative to fasten the upper upon a subsequent starting of the machine, of mechanism movable after the upper pulling operation into position to prevent the operation of said fastening means during the remainder of the cycle of the machine.

13. In a machine for working an upper over a last and for fastening the upper organized to come automatically to a stop prior to the upper fastening operation, the combination with means for working the upper over the last and means for fastening the upper, of mechanism adapted for manual movement in the pause in the cycle of the machine prior to the upper fastening operation into position to prevent the normal operation of said fastening means during the remainder of the cycle.

In testimony whereof I have signed my name to the specification.

HEINRICH WALTHER.

Certificate of Correction.

It is hereby certified that the assignee in Reissue Letters Patent No. 15,309, granted March 14, 1922, upon the application of Heinrich Walther, of Frankfort-on-the-Main, Germany, for an improvement in "Pulling-Over Machines," was erroneously described and specified as "United Shoe Machinery Company, of Paterson, New Jersey, a Corporation of New Jersey," whereas said assignee should have been described and specified as *United Shoe Machinery Corporation, of Paterson, New Jersey, a Corporation of New Jersey*, as shown by the records of assignments in this office; and that the said Letters Patent should be read with this correction therein that the same may conform to the record of the case in the Patent Office.

Signed and sealed this 17th day of April, A. D., 1922.

KARL FENNING,

[SEAL.]

*Acting Commissioner of Patents.*